No. 783,921.  
Patented February 28, 1905.

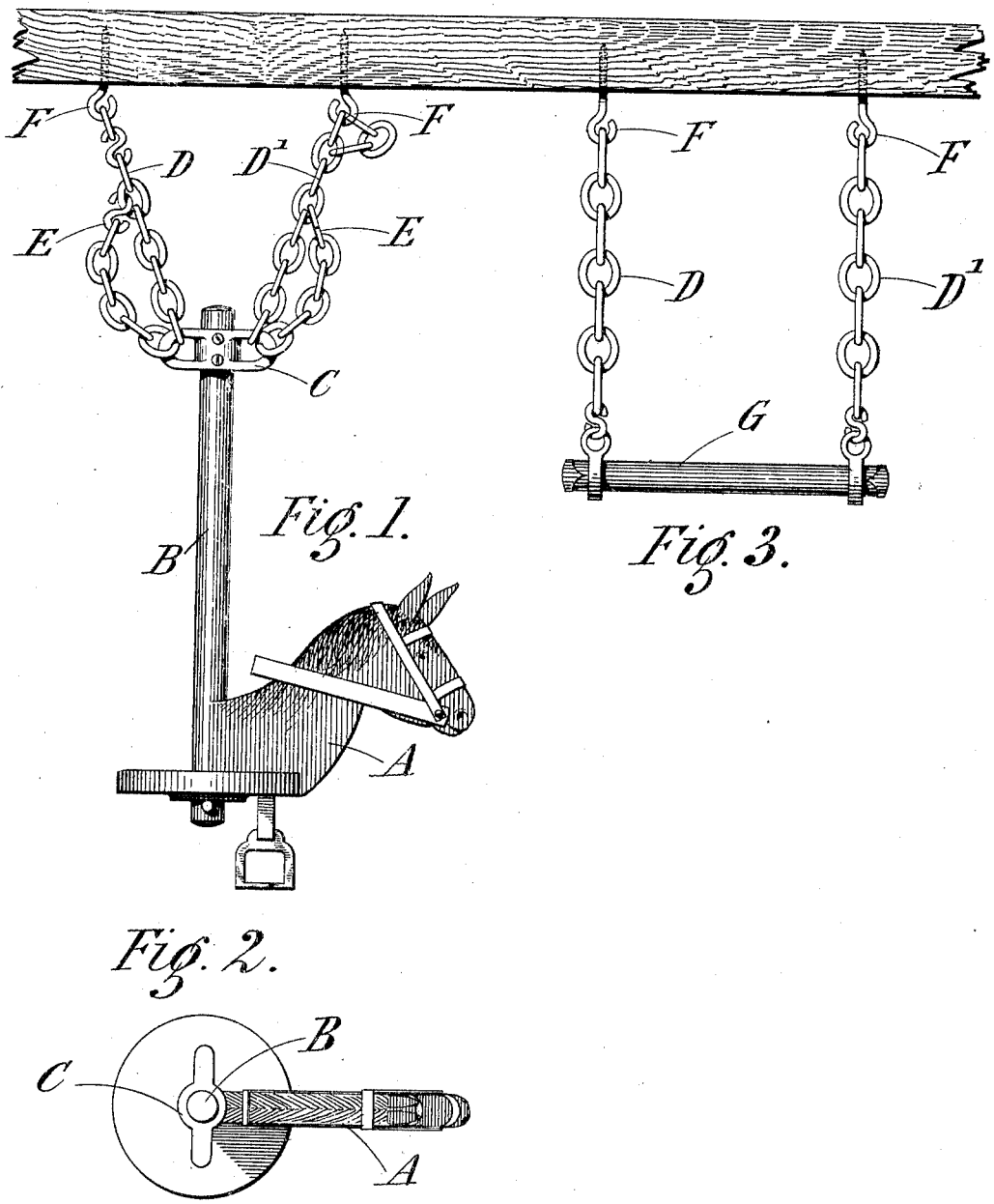

UNITED STATES PATENT OFFICE.

WILLIAM PRICE ABELL, OF DUFFIELD, ENGLAND.

EXERCISING APPARATUS FOR BABIES.

SPECIFICATION forming part of Letters Patent No. 783,921, dated February 28, 1905.

Application filed March 25, 1904. Serial No. 200,068.

*To all whom it may concern:*

Be it known that I, WILLIAM PRICE ABELL, a subject of the King of Great Britain, residing at Castle Hill, Duffield, in the county of Derby, England, have invented new and useful Improvements in Exercising Apparatus for Babies, of which the following is a specification.

The object of this invention is to provide a rocking horse which swings, and thus causes no noise and no vibration and also does away with the danger of toes and fingers being squashed under the old-fashioned rockers. Furthermore, this can be fixed to any beam or in any doorway, and, furthermore, can be converted into a horizontal bar. To attain this end, I construct a horse's head fixed to a seat. This seat I fix to a pole about three feet long, and on the top end of this pole I fix a ferrule having an eye on each side. Through each of these eyes I thread a chain having an S-hook at each end of each said chain. One end of the chain I pass through the hooks, secured to the top of a doorway or a beam. I attain these objects by the mechanism illustrated in the accompanying drawings, in which—

Figure 1 is the elevation showing my invention. Fig. 2 is plan of same. Fig. 3 shows my invention arranged as a horizontal bar.

Referring to Figs. 1, 2, and 3, I provide a horse's head A, secured to a shaft B. To the top end of said shaft B, I fix a double-eyed ferrule C, the object of this double eye C being to prevent the horse twisting when swinging, (a very important part of my invention.) Through this ferrule C, I thread two chains D D', each chain having S-hooks E at each end, thereby enabling the length of the chains to be adjusted. These chains D D' are hooked onto or passed through the two hooks F, the horse thus swinging at an arch with the hooks F as centers. The child sits on the seat when using the apparatus for a rocking horse or swing, stands on the seat when using it as a flexor-developer for strengthening the legs, and replaces the double-eyed ferrule C with the horizontal bar G when using the apparatus as a horizontal bar.

What I claim as my invention, and desire to secure by Letters Patent, is—

The eyed socket C, fixed to the end of a pole B, chains E, hooks F, flanged ferrule H, fixed at the end of said pole B and horse's head A and seat secured to a pole B and said flanged ferrule C when combined and arranged as and for the purpose described.

In testimony whereof I have signed my name to this specification in the presence of two subscribing witnesses.

WILLIAM PRICE ABELL.

Witnesses:
CHAS. N. DANIELS,
LUTHER J. PARR.